April 24, 1945.  A. C. ORKFRITZ  2,374,302
ELECTRIC BROILING DEVICE
Original Filed June 8, 1940
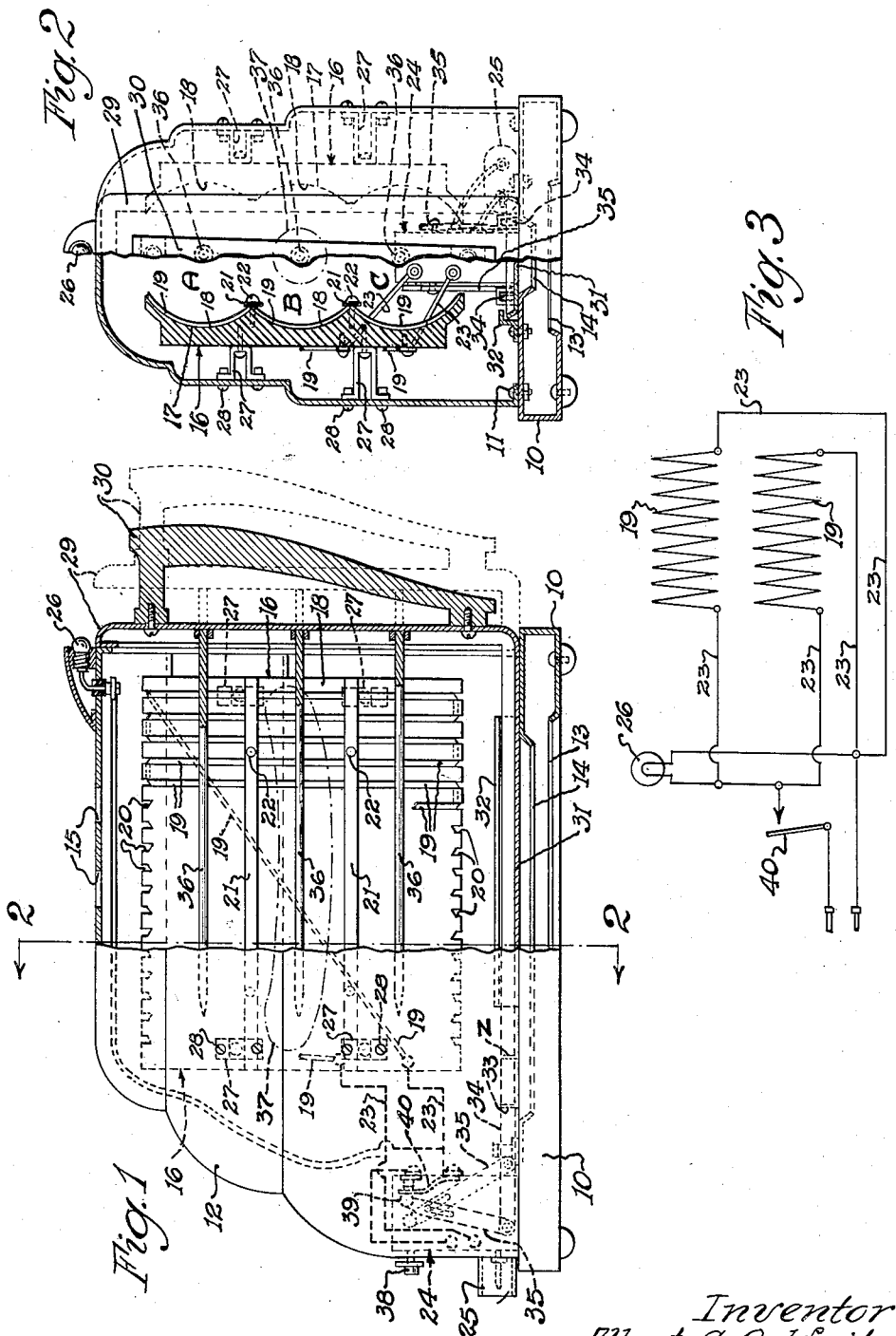
Inventor
Albert C. Orkfritz
by Frank J. Schraeder Jr
Attorney Patented Apr. 24, 1945

2,374,302

UNITED STATES PATENT OFFICE 2,374,302

ELECTRIC BROILING DEVICE

Albert C. Orkfritz, Los Angeles, Calif.

Original application June 8, 1940, Serial No. 339,415. Divided and this application May 8, 1943, Serial No. 486,469

3 Claims. (Cl. 99—392)

This invention relates generally to new and useful improvements in electric broiling devices and has particular reference to a novel and, preferably portable, electric broiler for sausages and the like having one or more laterally disposed open electric grills adapted in operation to simulate broiling grills of the open fire type such as wood, coal or charcoal grills.

One of the objects of my invention is to provide an electric grill having one or more open grill sections and means adapted to support one or more sausages near such sections for broiling and whereby sausages, such as frankfurters or wienerwurst, and the like, may be broiled, browned, or even charred by being subjected to the direct action of intense heat rays emanating directly from an electric heating element or elements.

Another object of my invention is to provide a portable electrically operated broiler for sausages and the like having a plurality of sausage supports, preferably spaced one from the other, and removably positioned, preferably as a removable unit, within an elongated oven-like casing having therein an electrically heated filament providing direct unobstructed impingement of heat rays, emanating directly from said filament, upon said sausages.

Still another feature of my invention resides in the arrangement of the sausage supports relatively to broiling members having heat emitting arcuate filament sections and which broiling members are spaced at opposite sides of the sausages so that practically the major areas of the opposite half portions of the sausages are subjected to the direct broiling action of the intense heat of such filament sections.

With the above and other objects in view, which will become readily apparent from the perusal of the following specification and attached drawing wherein is shown a preferred embodiment of my invention, my invention consists in the novel combination, construction and arrangement of the parts and members illustrated in the attached drawing, described in the following specification, and particularly pointed out in the appended claims.

This application is a division of my pending application, Serial No. 339,415, filed June 8, 1940, which has issued on September 21, 1943, as Patent No. 2,329,937.

In the drawing:

Fig. 1 shows a half side elevation and half longitudinal section of a broiler embodying my invention;

Fig. 2 shows a half end elevation and half vertical section of the broiler shown in Fig. 1; the half vertical section being taken on line 2—2 of Fig. 1; and Fig. 3 shows a diagram of the electrical circuit.

In the embodiment of my invention illustrated in Figs. 1 and 2, I show my invention adapted to a horizontal type of broiler which includes a suitable, preferably hollow, base 10 onto which is secured, as by the bolts 11, the hollow ornate casing or housing 12.

The hollow base 10 is provided with elongated openings 13 and 14 to provide ventilation for gases from within the casing 12 through openings 15 in the top of the casing.

In the embodiment of my invention as illustrated in the drawing, I provide within the interior of the casing 12 three laterally disposed superposed elongated broiling compartments A, B and C disposed between a pair of transversely spaced opposed filament-supporting members 16 of electrically non-conductive material such as, for example, porcelain.

The opposed inner sides 17 of the members 16 are each preferably formed with laterally extending arcuate faces 18 preferably of segmental cross-section which define the sides of the broiling chambers A, B and C.

The members 16 support the filaments 19 which are carried in laterally spaced notches 20 in the upper and lower edges of the members 16 and these filaments 19 are secured to the lateral flat ridges of the members 16, which extend longitudinally of the members 16 between the arcuate faces 18, as by porcelain strips 21 removably attached by screws 22.

The terminals of the filaments are electrically connected by the conductors 23 to a suitable clock-controlled device generally indicated by numeral 24.

A suitable electric current connection socket 25 is provided which is adapted to receive a suitable connection plug of an electric power conductor for supplying electric current to the broiler filaments and clock-controlled device 24.

A suitable electric pilot light 26 is provided for indicating the closed position of the electric switch which controls the energization of the filaments.

The filament-supporting members 16 are supported on U-shaped brackets 27 suitably removably secured to the inside face of the casing 12, as by bolts 28.

The casing 12 is open at one end only and at such end is provided with a cover 29 which has secured thereto a suitable handle 30. The cover 29 is formed with an integral drip pan 31, extending laterally inwardly from its lower end. The pan 31 is guided and retained between a pair of Z-bars 32 secured to the top of the base 10.

A pan 31 is arranged below the superposed chambers A, B and C to receive therein the fat drippings from the broiled sausages, and the inner end 33 of the pan 31 is in abutment with a pair of slidable pushers 34 which are located one on each side of the clock-controlled device 24. Each pusher 34 is pivotally connected to a link 35 operable by a clock-controlled mechanism in the device 24.

The broiler is provided with suitable means for supporting sausages, or the like, substantially within the central portions of the chambers A, B and C where same are exposed to heat rays emanating directly from the heated filaments 19. I have illustrated a preferred form of such supports in the form of pointed elongated spits 36 which are secured at their rear ends to the closure cover 29. A sausage 37, indicated by broken lines in the broiling chamber B, is shown threaded upon the pin-like spit 36.

The device 24 is provided with a control knob 38 for selectively setting the time-controlled mechanism.

When the knob 38 is rotated into broiling operation, the spring in the device 24 is wound up by such rotation of knob 38. The insertion of the sausage-loaded closure cover 29 into the casing 12 will move the links 35 rearwardly, and in such rearward movement of the links 35, an upper extension 39 on one of such links 35 is brought into engagement with a switch 40 to close the electric circuit which energizes the filaments 19 and the pilot light 26.

When the period of time set by the knob 38 has elapsed, the clock mechanism in the device 24 will act to move the links 35 forwardly to thereby cause a forward movement of the pushers 34 which will engage the inner end 33 of the pan 31 and push same outwardly of the casing to about the point Z. In such outward movement of the pan 31 and closure-cover 29, the switch-operating upper end extension 39 will be disengaged from the switch 40 to permit it to move into open position to open the circuit to the filaments 19 and pilot light 26 whereupon the cover 29 may be manually completely withdrawn to permit removal of the broiled sausages.

From the above description and attached drawing it will be readily apparent that I have disclosed an electric broiling device which is adapted for broiling sausages and similar food articles by the direct unobstructed impingement thereon of intense heat rays emanating directly from an electric heat-emitting filament; the sausage or the like being subjected to broiling by radiant glow heat simulating the action of broiling grills of the open fire type such as wood, coal or charcoal grills.

I claim:

1. An electric broiler comprising a casing enclosing a plurality of adjacent broiling chambers, a pair of spaced filament supports having opposed arcuate faces substantially defining spaced sides of said broiling chambers, an electric heat-emitting filament having arcuate portions conforming to said arcuate faces supported on said filament supports, and means for supporting a sausage in each of said chambers for broiling by the direct unobstructed impingement thereon of heat rays emanating directly from said filaments.

2. An electric broiler as embodied in claim 1 and including a cover for said casing, said means being supported on said cover and removable with said cover from the casing.

3. An electric broiler as embodied in claim 1 wherein said plurality of adjacent broiling chambers consist of vertically superposed elongated chambers.

ALBERT C. ORKFRITZ.